United States Patent [19]

Bellhouse

[11] Patent Number: 5,167,817
[45] Date of Patent: Dec. 1, 1992

[54] TRANSFER MEMBRANE APPARATUS

[76] Inventor: Brian J. Bellhouse, The Lodge, North Street, Islip, Oxfordshire OX5 2SQ, England

[21] Appl. No.: 474,064
[22] PCT Filed: Nov. 1, 1988
[86] PCT No.: PCT/GB88/00946
§ 371 Date: May 29, 1990
§ 102(e) Date: May 29, 1990
[87] PCT Pub. No.: WO89/04197
PCT Pub. Date: May 18, 1989

[30] Foreign Application Priority Data

Nov. 2, 1987 [GB] United Kingdom ............... 8725636

[51] Int. Cl.⁵ .................................... B01D 61/28
[52] U.S. Cl. ................. 210/321.75; 210/356
[58] Field of Search ............ 210/321.75, 321.84, 210/356, 456, 321.6

[56] References Cited

U.S. PATENT DOCUMENTS

| | | | |
|---|---|---|---|
| 3,362,540 | 1/1968 | Bluemle, Jr. | 210/321.75 |
| 3,540,595 | 11/1970 | Edwards | 210/321 |
| 4,383,921 | 5/1983 | Bellhouse et al. | 210/321 |
| 4,636,309 | 1/1987 | Bellhouse | 210/356 X |

FOREIGN PATENT DOCUMENTS 0111423 7/1983 European Pat. Off. .
1593273 5/1970 France .
1239211 of 1911 United Kingdom .

OTHER PUBLICATIONS

Transactions/American Soc. for Artificial Internal Organs, vol. XXVII, 1981 (Washington, D.C.), K. Abel et al.: "A Practical Secondar-Flow Hemodialyzer", pp. 639–643, see pages 639–640: Design for the Vortex-Mixing Hemodialyzer.

Primary Examiner—Frank Spear
Attorney, Agent, or Firm—Baker & Daniels

[57] ABSTRACT

A transfer membrane assembly in which one fluid is passed with a pulsatile flow through a first conduit between two transfer membranes which are provided with a close packed array of dimples so that vortex mixing occurs. Second conduits are formed on the other side of each membrane between that membrane and an adjacent profiled plate. Each dimple partially nests in a depression in the respective plate, the depressions being connected in rows by grooves. The maximum diameter and depth of each dimple is less than the corresponding dimensions of the respective depression.

17 Claims, 4 Drawing Sheets

TRANSFER MEMBRANE APPARATUS

DESCRIPTION

My EP-A-0111423 discloses a membrane assembly (hereinafter referred to as of the kind described) for use in mass or heat transfer apparatus, and comprising a pair of generally parallel plates spaced apart with a profiled surface of one plate facing a similarly profiled surface of the other plate, and a pair of sheets of transfer membrane material closely spaced, throughout substantially their whole area, face to face between the plates with each sheet supported by and partially nesting in the profiled surface of the adjacent plate, thereby providing between the membranes a first conduit for a first fluid, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profiled surfaces of the plates being provided by depressions in alignment with the dimples in the respective membrane and interconnected by grooves; the arrangement being such that if, in use, one fluid is passed through the first conduit with a pulsatile flow, vortex mixing occurs in the dimples in the membranes.

The pulsatile flow may be produced by superimposing on a mean flow of the first fluid through the first conduit a pulsatile component which promotes the vortex mixing of the fluid. As particularly described in the EP specification, the dimples in each membrane are provided in parallel rows the dimples in each row being longitudinally offset halfway between adjacent dimples in the adjacent rows so that lateral nesting of adjacent rows occurs. The depressions in the plates are also arranged in longitudinal rows along the direction of the mean flow, the grooves interconnecting one depression to the next along the respective row.

In this kind of membrane assembly, the efficiency of the transfer across the membrane is high as the total volume of first fluid which can be brought into close proximity with the membrane, as a result of the vortex mixing, is high.

Apparatus using such a transfer membrane assembly has been used successfully for the oxygenation of blood, in which case blood is passed through the first conduit and oxygen-containing gas through the second conduits. In this case the membrane have usually been hydrophobic. The assembly has also been used successfully for filtration of aqueous liquid, in which case the membranes are preferably hydrophilic, so that good wetting occurs. For example, filters incorporating the membrane assembly have proved extremely successful for harvesting plasma from whole blood by plasmaphersis or using donated blood, as the assembly provides high filtration rates per unit membrane area, works well at low rates of blood flow (60–80 ml/min) and is not prone to the kind of fouling which is a complication of conventional membrane plasma filters. In fact filtration rate has been about four times as high as that achieved by conventional membrane filters of the same area. Also, filters incorporating such a membrane assembly have proved successful experimentally in the concentration by filtration of bacterial, mammalian or plant cells in biotechnological work. In these cases the whole blood or other liquid to be filtered is passed through the first conduit and the filtrate is collected in the second conduits.

Each second conduit will have an inlet and an outlet if through flow is required, e.g. in countercurrent to the flow of the first fluid through the first conduit. On the other hand, if the apparatus is set up for filtration, only an outlet from each second conduit may suffice.

In spite of these successes with the membrane assembly described in the EP specification, there are two areas where I have sought improvement.

The first is that, as clearly illustrated in FIG. 5 of the EP specification, the maximum diameter of each dimple in each membrane was the same as that of the associated depression in the adjacent profiled support plate. As a result, there was a lower limit to the radius of curvature of dimple to maintain adequate spacing between the membrane and the wall of the corresponding depression in the plate, in order to avoid undue restriction of the corresponding second conduit and the production of areas of stagnation at the periphery of the zone defined between each dimple and the corresponding depression in the plate. This in turn dictated a minimum acceptable aspect ratio of maximum diameter to maximum depth of each dimple of 3:1 as mentioned in the EP specification, but in practice of 5:1. As a result the dimples have presented to the first conduit a shallowness which has been found to deter the promotion in the dimples of the vortices which are critical to this kind of membrane assembly.

Second, when the dimples in the membranes are preformed, and since the dimensions of the depressions in the profiled plates are of the order of magnitude of 1 mm, I have found great difficulty in accurately locating the membranes relatively to the profiled plates so that the dimples are centred in the plate depressions, during assembly of the plates and membranes. Any misalignment distorts the membranes and seriously interferes with the predetermined flow patterns on both sides of the membranes, and hence leads to a critical loss of efficiency. Furthermore, when the membranes are hydrophilic, even if they are formed in situ by the pressure of hot liquid in the first conduit, as described in the EP specification, they swell and their dimples readily become dislodged from the corresponding depressions in the profiled plates.

According to one aspect of the present invention, in a membrane assembly of the kind described, the maximum external diameter of each dimple, in a plane substantially parallel to the plane of the corresponding membrane sheet, is less than the corresponding diameter of the corresponding plate depression. The dimple diameter is preferably at least 10% less than, and most preferably substantially 20% less than, that of the plate depression.

Although it might be expected that this reduction in the maximum diameter of each dimple, would inhibit the production of vortices in the first fluid, the contrary appears to be the case. This apparently results from the increased angle which the peripheral edge of each dimple can make with the plane of the corresponding membrane sheet and/or in a reduction in the aspect ratio of the maximum dimple diameter to maximum dimple depth, which is preferably now less than 3. As a result, I have found that a filter incorporating a membrane assembly according to the invention can provide, when carrying out plasmafiltration, and as compared with a filter utilising a membrane assembly in accordance with the earlier EP specification, an increase in the plasma filtration rate from 18 ml/min using 200 cm² of membrane, to 35 ml/min for the same membrane area, i.e. an improvement of substantially 100%. The improved vortex mixing within the dimples has, when the assembly is used in a plasma filter, apparently also resulted in a reduction in fouling of the membrane by blood proteins and cells, no doubt as a result of the additional shear effect adjacent to the membrane within the dimples. Furthermore, when the membrane sheets are preformed with the dimples, because the dimples have a smaller maximum diameter than the corresponding depressions in the plates, assembly is remarkably simpler and the membranes stay located in the correct position relatively to the support plates each whey they have been thoroughly wetted and have swelled up.

Suitable hydrophilic microporous membranes for plasmafiltration or for the concentration of bio-cells are made from polysulphone and have pores of the order of 0.2 $\mu$ to 0.45 $\mu$ in diameter. Such membranes may be preformed with the appropriately shaped dimples by pressing them at a temperature of 80° C. between a female former made of brass and a male former moulded from silicone rubber. The male projections on the male former may consist of a hemispherical end portion supported by a cylindrical pedestal of the same diameter.

As distinct from the U-shaped conduits illustrated in the earlier EP specification, it is now considered to be simpler if the conduits are linear, for example if the plates are rectangular and an inlet and an outlet for the first fluid are provided adjacent to opposite ends of the plates. Manifolds may be provided at the opposite ends of the opposed rectangular plates for the first conduit, and the pulsatile flow through the first conduit is preferably provided by diaphragm pumps with flexible diaphragms extending across the ends of the plates and defining walls of the first conduit manifolds.

A further consideration with membrane assemblies of the kind described is that when they are first primed before use, particularly when the second fluid is a liquid, difficulties arise in clearing all residual air from the depressions and grooves constituting the second conduits. The earlier EP specification discloses the possible provision of additional grooves extending transversely across the rows of depressions in the profiled plates to interconnect the longitudinal grooves to help prevent stagnation along a whole row resulting from blockage of a signal depression in that row. This does not significantly alleviate the problem of purging any residual air upon priming.

According to a second, independent, aspect of the invention, but which may be used in combination with the first aspect of the invention, in a membrane assembly of the kind described, the profiled surface of each plate is additionally provided with a network of interconnecting channels which intersect the grooves and lead to an outlet for the second conduit, each channel having a larger cross section than that of a groove. This provides overall irrigation of the second conduits which both avoids areas of stagnation and also assists in purging air when the assembly is primed with a working liquid.

In the preferred case in which the plates are rectangular, the channels preferably extend one along each longer side of each plate, with a plurality of transverse channels interconnecting the side channels, to provide a ladder-like array of channels. The spacing of the transverse channels may be at least the spacing of every tenth depression in a row.

The problem of clearing all residual air from the depressions and grooves constituting the second conduits is also exacerbated if the membrane assembly is used in an orientation in which the grooves extend horizontally. It is then difficult for the air bubbles to rise within a matrix of liquid. It is therefore considered desirable to use the assembly with the grooves extending vertically, or at least with a vertical component. This conveniently involves using the assembly with the faces of the plates, and the general planes of the membrane, in vertical planes. However, if the plates are rectangular and the grooves, and hence the interconnected rows of depressions, extend parallel to the length of the plates, as might be through most natural for conveyence of the second fluid towards an outlet adjacent to an end of the plates, or in countercurrent to the first fluid, it would not be possible to mount the assembly with the length of the plates horizontal, which is the most desired configuration to balance the pump action at each end of the first conduit.

According to a third, independent, aspect of the invention, but which may be used in combination with the first and/or second aspect(s) of the invention, in a membrane assembly of the kind described, each plate is substantially rectangular and the first conduit is arranged to direct the flow therethrough from one end to the other along the length of the plates, the grooves, and hence the interconnected rows of depressions extending at an inclination to the length of the plates.

When the assembly is used with a longer edge of the plates lowermost, the inclined nature of the grooves, e.g. at 90°, or obliquely, to the edges of the plates, encourages any residual air bubbles to rise to the upper edge of the second conduits whilst, if the inclination is oblique, also promoting transportation along the plates towards an outlet from the respective second conduit. Outlets from the second conduits will then be provided adjacent to the upper edge of the second conduits, at one end if through flow of the second fluid is required, or at any convenient position if only an outlet is required. The profiled surface of each plate may be provided with a channel which extends along the uppermost longer side of the plate, intersects the grooves and leads to an outlet for the second conduit, the channel having a larger cross section than that of a groove.

An example of apparatus incorporating a membrane assembly constructed in accordance with the present invention, is illustrated in the accompanying drawings, in which.

Figure 1:
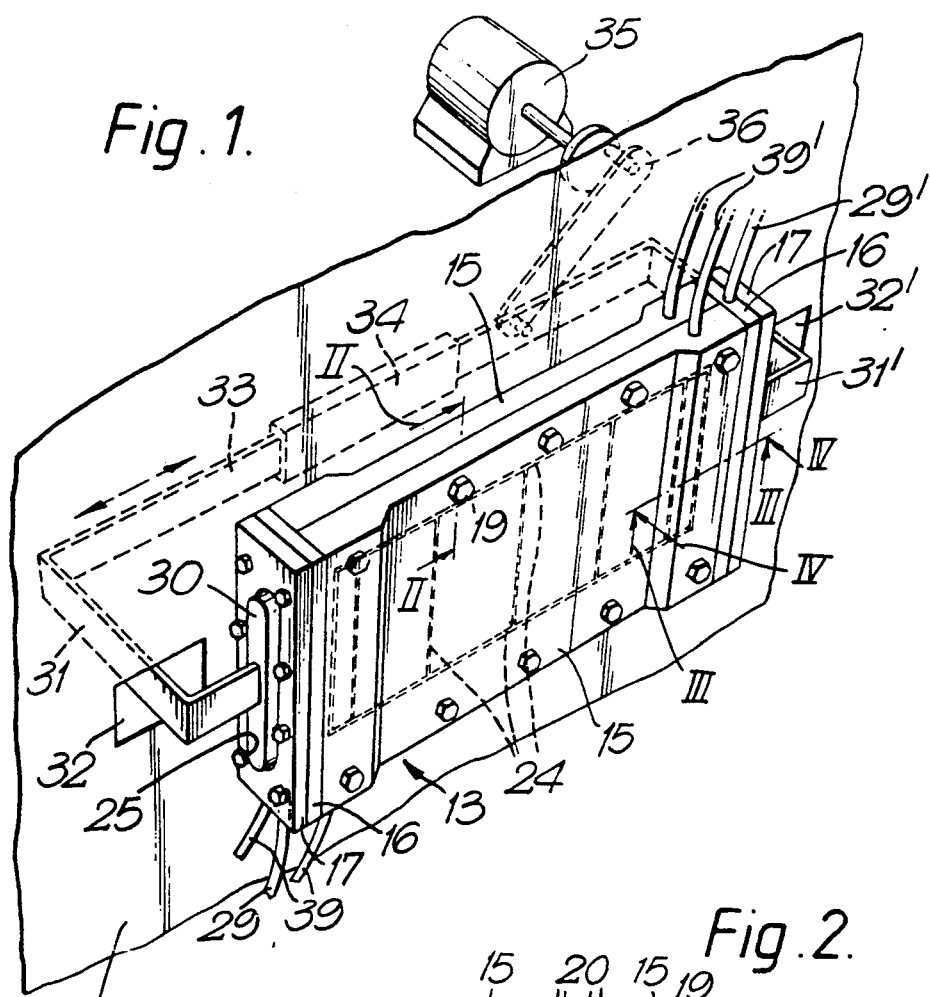
FIG. 1 is a diagrammatic perspective view of the apparatus.

As shown in FIG. 1, the apparatus 13 is carried face to face by an upright wall 14 and consists of similar opposed side plates 15 and similar pairs of end plates 16 and 17. The side plates 15 are rectangular and elongate and the facing adjacent surfaces of these plates are profiled. Positioned between the two profiled surfaces of the side plates 15 are a pair of membranes 18. Along the longer sides of the plates 15, the membranes 18 are sealed to one another and to the plates 15 by clamping bolts 19, which draw the plates together, and pairs of sealing beads 20, which are seated in grooves in the plates 15, and abut the the membranes 18. There is thus formed between the membranes 18, a central first conduit 22 and, between each membrane 18 and the adjacent profiled surface of the adjacent plate 15, and outer second conduit 23. The profiled surfaces of the plates are also formed with a ladder-like array of channels 24 which ensure complete irrigation and initial debubbling of the second conduits 23 between the membranes and profiled faces of the plates 15.

At each of the ends of the plates 15, the two plates 16 and 17 are bolted to them by bolts 25 and the ends of the membranes 18 are clamped between the ends of the plates 15 and the end plates 16. Clamped between each of the plates 16 and the adjacent plate 17, is it an outwardly extending flange 26 of a flexible diaphragm 27. A manifold 28, in communication with the adjacent end of the primary chamber 22, is formed within an open interior of the plate 16 and each of these manifolds 28 is connected through a bore 21 with an external nipple and hose 29, 29'. The diaphragm 27 are accommodated within openings within the respective plates 17 and are acted upon by respective pushers 30, 30' carried by arms 31, 31', which work through elongate slots 32, 32' in the board 14, and carried on respective ends of a member 33. This member is reciprocable in a linear bearing 34 by means of a motor 35 acting through a crank 36. As the member 33 is moved to and fro liquid is flushed to and fro through the first conduit 22. However, if mean flow through the conduit 22 is required, the stroke of the pusher 30 extends further into the respective plate 17 than does the pusher 30', as a result of which there is superimposed upon the reciprocation flow in the first conduit 22, a component which provides a net mean flow from the inlet hose 29 to the outlet hose 29'.

At each end of the plates 15, each of the second conduits 23 and a respective one of the channels 24 communicates through a port 37 in the respective plate via a bore 38 in the respective plate, with a nipple and hose 39, 39'.

Figure 2:
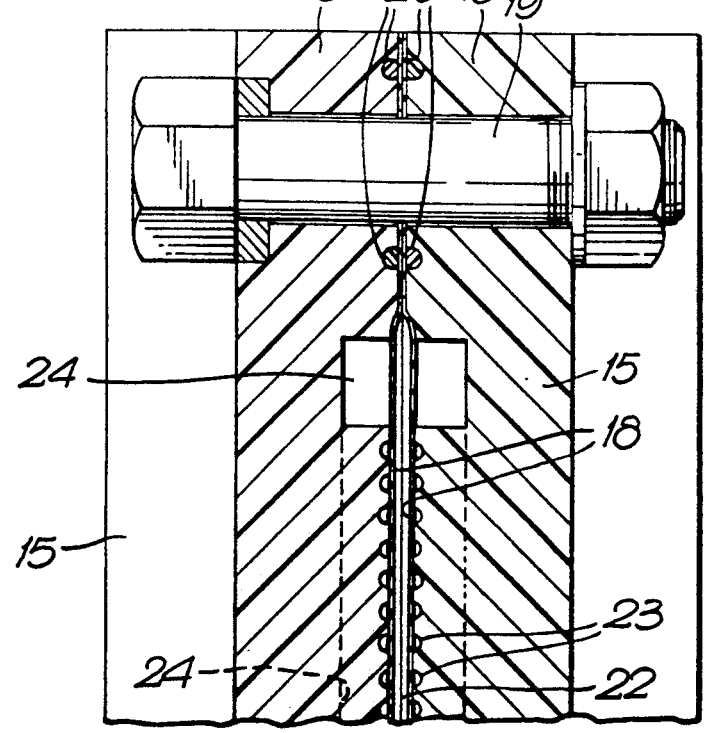
FIG. 2 is a section taken on the line II—II in FIG. 1.
Figure 3:
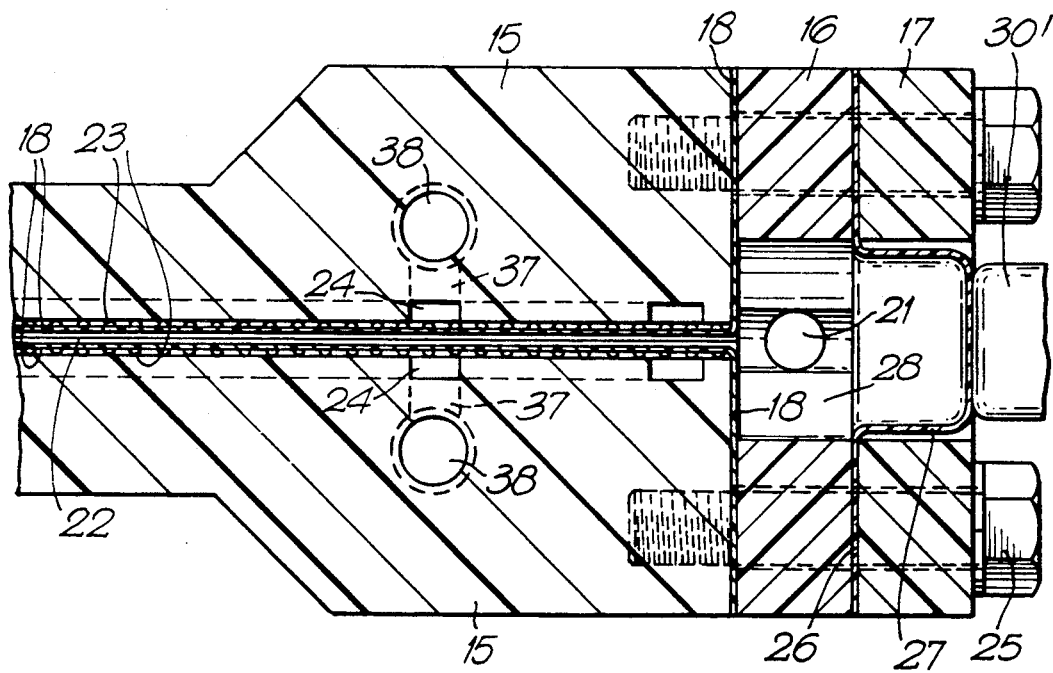
FIG. 3 is a section taken on the line III—III in FIG. 1.
Figure 4:
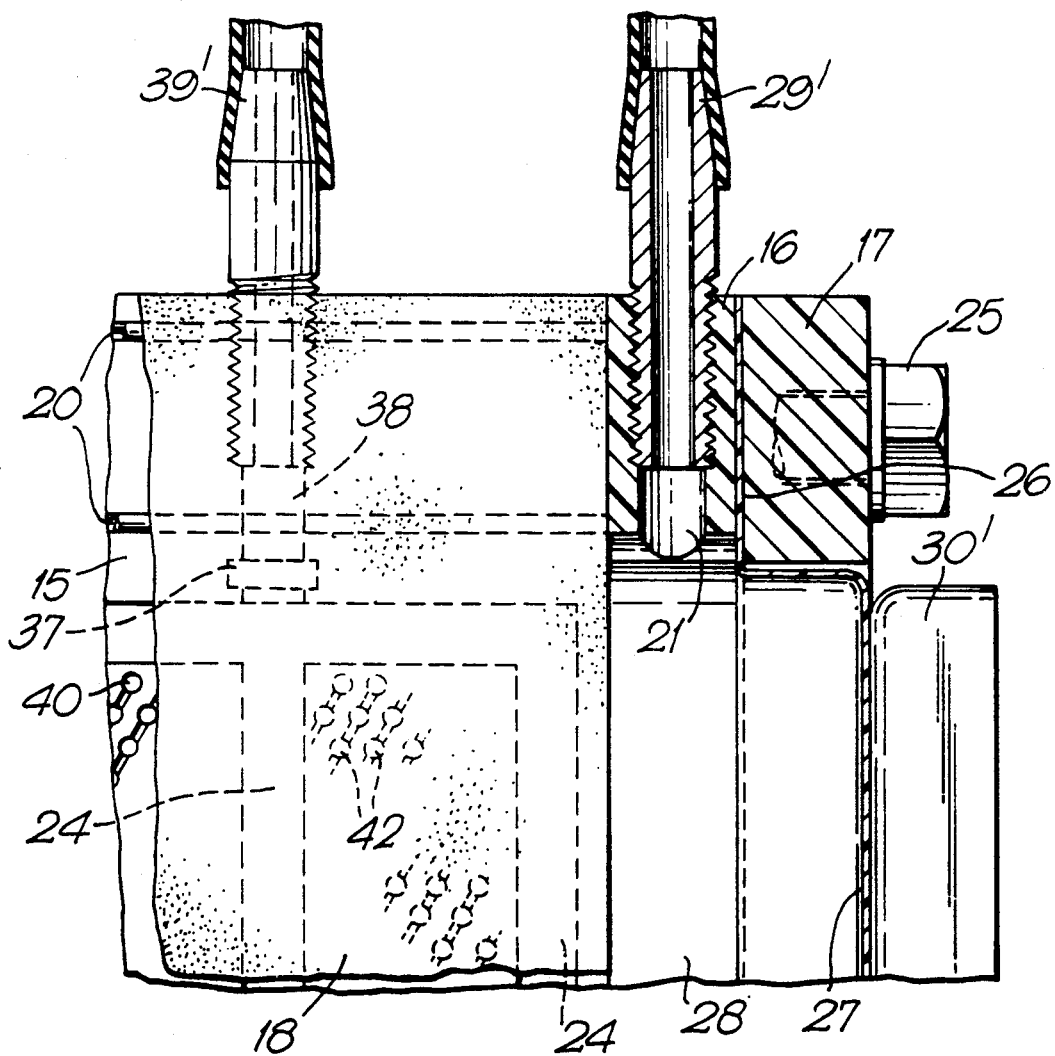
FIG. 4 is a section taken on the line IV-IV in FIG. 1.
Figure 5:
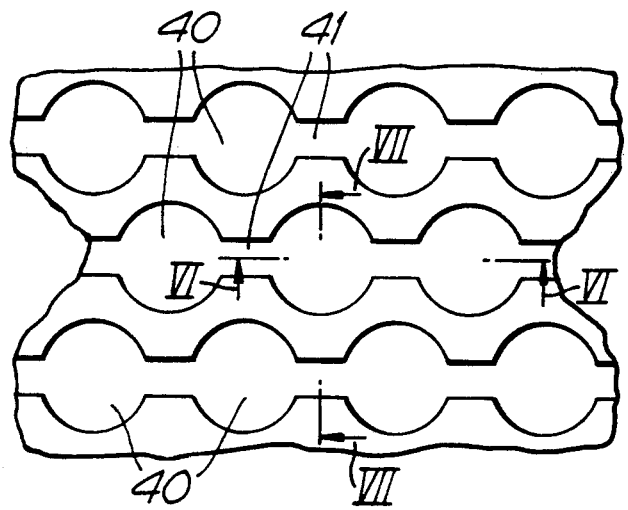
FIG. 5 is a plan of the profiled surface of one plate of the reactor.
Figure 6:
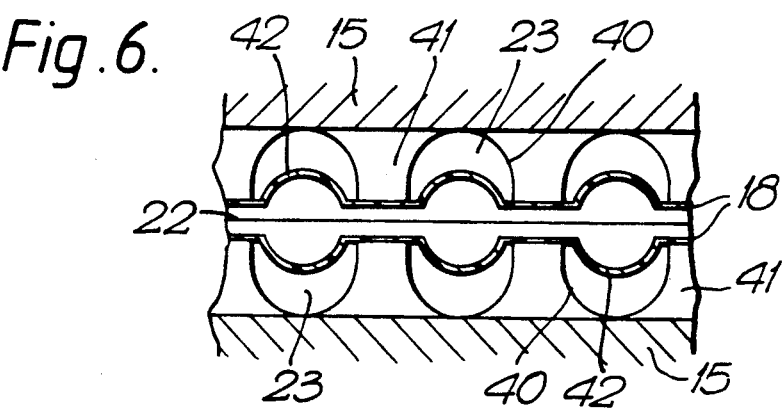
FIGS. 6 and 7 are sections through the two plates of the reactor juxtaposed with two membranes between them, and taken respectively on the lines VI—VI, and VII—VII, in FIG. 5.
Figure 7:
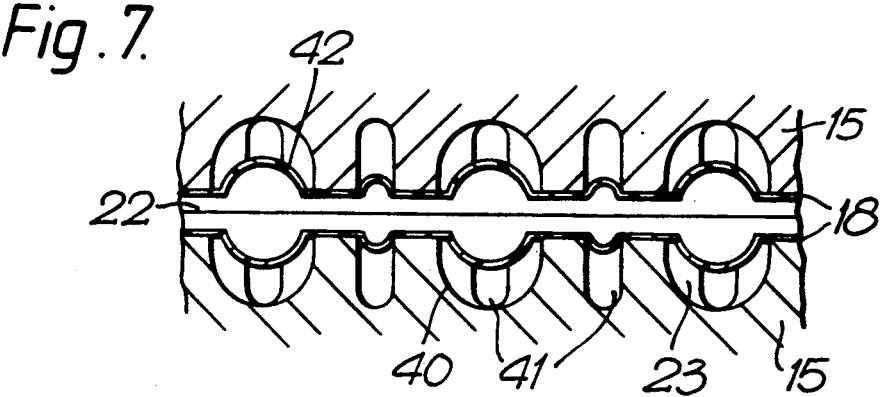

As suggested in FIGS. 2, 3 and 4, shown more clearly in the enlarged FIGS. 5, 6 and 7, the profiled face of each plate 15 is provided with a close packed array of substantially hemispherical depressions 40 which are arranged in parallel rows extending obliquely at 60° to the longer dimension of the plate, depressions in each row being offset half way between those in adjacent rows, to provide the close packing. Adjacent depressions in each row are interconnected by grooves 41. The membranes 18 are each performed with an array of dimples 42, centred on the depressions in the plates such that when the membranes are assembled between the plates, the dimples 42 partially nest in the depressions, as shown in FIGS. 6 and 7. The first conduit 22 is thus formed in the continual spacing between the membranes 18, and the second conduits 23 are formed by the spaces between the bottoms of the dimples and the bottoms of the corresponding depressions, together with the grooves 41. Each depression 40 has a maximum diameter of 1.5 mm, and a maximum depth of 1.3 mm and each dimple 42 has a maximum external diameter of 1.2 mm and a maximum depth of 0.42 mm. The maximum external diameter of a dimple 42 is therefore 20% less than that of a depression 40 and the aspect ratio of the maximum diameter to the maximum depth of each dimple is 2.85.

When the dimensions of the depressions and dimples are as above, it would be appropriate for the transverse channels 24 to be spaced at about 20 mm intervals along the plates. To appreciate what this means in the context, each of the plates 15 is substantially 150 mm long and 100 mm wide. When the apparatus is used in the orientation shown in FIG. 1, the lowermost horizontal channel 24 could be omitted. Also, if the grooves 41 were inclined at 90° to the length of the plates, i.e. vertically, the vertical channels 24 could also be omitted, leaving only the horizontal channel 24 along the uppermost longer edge of each plate.

In use when liquid in the first conduit 22 is flushed to and for between the manifolds 28, by the out of phase action of the pushers 30, vortices in the liquid are set up in the dimples 42. This brings a greater quantity of the liquid into intimate contact with the membranes and hence enhances the transfer of gas or other material through the membranes to or from the liquid.

I claim:

1. A membrane assembly for use in mass or heat transfer apparatus and comprising a pair of generally parallel plates spaced apart with a profiled surface of one plate facing a similarly profiled surface of the other plate, and a pair of sheets of transfer membrane material closely spaced, throughout substantially their whole area, face to face between the plates with each sheet supported by and partially nesting in the profiled surface of the adjacent plate, thereby providing between the membranes a first conduit for a first fluid, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profile surfaces of the plates being provided by depressions in alignment with the dimples in the respective membrane and interconnected by grooves; the arrangement being such that if, in use, one fluid is passed through the first conduit with a pulsatile flow, vortex mixing occurs in the dimples in the membranes; characterized in that the maximum external diameter of each dimple, in a plane substantially parallel to the plane of the corresponding membrane sheet, is at least 10% less than that of the corresponding plate depression.

2. An assembly according to claim 1, in which the maximum diameter of each dimple is substantially 20% less than that of the corresponding plate depression.

3. An assembly according to claim 2, in which the aspect ratio of the maximum diameter of each dimple to the maximum depth of the dimple is less than 3.

4. An assembly according to claim 1, in which the aspect ratio of the maximum diameter of each dimple to the maximum depth of the dimple is less than 3.

5. An assembly according to claim 1, in which the plates are rectangular and an inlet and an outlet for the first fluid are provided adjacent to opposite ends of the plates.

6. An assembly according to claim 5, in which manifolds are provided at the opposite ends of the opposed rectangular plates for the first conduit, and there are diaphragm pumps with flexible diaphragms extending across the ends of the plates and defining walls of the first conduit manifolds, in use to provide the pulsatile flow through the first conduit.

7. An assembly according to claim 5, which is arranged to be used with the faces of the plates in vertical planes and with the length of the plates substantially horizontal, and in which the grooves, and hence the interconnecting rows of depressions extend at an inclination to the length of the plate.

8. An assembly according to claim 1, in which the dimples in each membrane are provided in parallel rows with the dimples in each row being longitudinally offset halfway between adjacent dimples in the adjacent rows so that lateral nesting of adjacent rows occurs, the depressions in the plates also being arranged in corresponding rows with the grooves interconnecting one depression to the next along the respective row.

9. An assembly according to claim 8, in which the profiled surface of each plate is provided with a channel which extends along the uppermost longer side of the plate, intersects the grooves and leads to an outlet for the second conduit, the channel having a larger cross section than that of a groove.

10. An assembly according to claim 1, in which the aspect ratio of the maximum diameter of each dimple to the maximum depth of the dimple is less than 3.

11. An assembly according to claim 1, in which the plates are rectangular and an inlet and an outlet for the first fluid are provided adjacent to opposite ends of the plates.

12. A membrane assembly for use in mass or heat transfer apparatus and comprising a pair of generally parallel plates spaced apart with a profiled surface of one plate facing a similarly profiled surface of the other plate, and a pair of sheets of transfer membrane material closely spaced, throughout substantially their whole area, face to face between the plates with each sheet supported by and partially nesting in the profiled surface of the adjacent plate, thereby providing between the membranes a first conduit for a first fluid, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profiled surfaces of the plates being provided by depressions in alignment with the dimples in the respective membrane and interconnected by grooves and additionally provided with a network of interconnecting channels which intersect the grooves and lead to an outlet for the second conduit, each channel having a larger cross section than that of a groove; the arrangement being such that if, in use, one fluid is passed through the first conduit with a pulsatile flow, vortex mixing occurs in the dimples in the membranes; characterized in that the maximum external diameter of each dimple, in a plane substantially parallel to the plane of the corresponding membrane sheet, is less than the corresponding diameter of the corresponding plate depression.

13. A membrane assembly for use in a mass or heat transfer apparatus and comprising a pair of generally parallel plates spaced apart with a profiled surface of one plate facing a similarly profiled surface of the other plate, and a pair of sheets of transfer membrane material closely spaced throughout substantially their whole area, face to face between the plates with each sheet supported by and partially nesting in the profiled surface of the adjacent plate, thereby providing between the membranes a first conduit for a first fluid, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profiled surfaces of the plates being provided by depressions in alignment with the dimples in the respective membrane and interconnected by grooves; the arrangement being such that if, in use, one fluid is passed through the first conduit with a pulsatile flow, vortex mixing occurs in the dimples in the membranes, characterized in that the profiled surface of each plate is additionally provided with a network of interconnecting channels which intersect the grooves and lead to an outlet for the second conduit, each channel having a larger cross section than that of a groove.

14. A membrane assembly for use in mass or heat transfer apparatus and comprising a pair of generally rectangular parallel plates spaced apart with a profiled surface of one plate facing a similarly profiled surface of the other plate, and a pair of sheets of transfer membrane material closely spaced throughout substantially their whole area, face to face between the plates with each sheet supported by and partially nesting in the profiled surface of the adjacent plate, thereby providing between the membranes a first conduit for a first fluid, an inlet and outlet for the first fluid adjacent to opposite ends of the plates, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profiled surfaces of the plates being provided by depressions in alignment with the dimples in the respective membrane and interconnected by grooves and additionally provided with a network of interconnecting channels which intersect the grooves and lead to an outlet for the second conduit, each channel having a larger cross section than that of a groove; the arrangement being such that if, in use, on fluid is passed through the first conduit with a pulsatile flow, vortex mixing occurs in the dimples in the membranes; characterized in that the maximum external diameter of each dimple, in a plane substantially parallel to the plane of the corresponding membrane sheet, is less than the corresponding diameter of the corresponding plate depression.

15. An assembly according to claim 14, in which the channels extend one along each longer side of each plate, with a plurality of transverse channels interconnecting the side channels, to provide a ladder-like array of channels.

16. A membrane assembly for use in mass or heat transfer apparatus and comprising a pair of generally rectangular parallel plates spaced apart with a profiled surface of one plate facing a similarly profiled surface of the other plate, and a pair of sheets of transfer membrane material closely spaced, throughout substantially their whole area, face to face between the plates with each sheet supported by and partially nesting in the profiled surface of the adjacent plate, thereby providing between the membranes a first conduit for a first fluid, manifolds attached at the opposite ends of the opposed rectangular plates for the first conduit, diaphragm pumps with flexible diaphragms extending across the ends of the plates defining walls of the first conduit manifolds, in use to provide a pulsatile flow through the first conduit an inlet and an outlet for the first fluid adjacent to opposite ends of the plates, and between each membrane and the adjacent plate a second conduit for a second fluid, each membrane presenting in its surface facing the other membrane a regular close packed array of permanent dimple-like depressions each facing and substantially aligned with a similar depression in the other membrane, and the profiled surfaces of the plates being provided by depressions in alignment with the dimples in the respective membrane and interconnected by grooves and additionally provided with a network of interconnecting channels which intersect the grooves and lead to an outlet for the second conduit, each channel having a larger cross section than that of a groove; the arrangement being such that if, in use, one fluid is passed through the first conduit with the pulsatile flow, vortex mixing occurs in the dimples in the membranes; characterized in that the maximum external diameter of each dimple, in a plane substantially parallel to the plane of the corresponding membrane sheet is, less than the corresponding diameter of the corresponding plate depression.

17. An assembly according to claim 16, in which the channels extend one along each longer side of each plate, with a plurality of transverse channels interconnecting the side channels to provide a ladder-like array of channels.

* * * * *